(12) United States Patent
Vaysman

(10) Patent No.: US 10,395,282 B2
(45) Date of Patent: Aug. 27, 2019

(54) COUPON PLACEMENT WITHIN AN ADVERTISEMENT

(71) Applicant: Aintu Inc., San Jose, CA (US)

(72) Inventor: Arthur Vaysman, San Jose, CA (US)

(73) Assignee: Aintu Inc., San Jose, CA (US)

( * ) Notice: Subject to any disclaimer, the term of this patent is extended or adjusted under 35 U.S.C. 154(b) by 0 days.

(21) Appl. No.: 14/831,835

(22) Filed: Aug. 20, 2015

(65) Prior Publication Data

US 2016/0055548 A1 Feb. 25, 2016

Related U.S. Application Data

(60) Provisional application No. 62/039,839, filed on Aug. 20, 2014.

(51) Int. Cl.
*G06Q 30/02* (2012.01)

(52) U.S. Cl.
CPC ................ *G06Q 30/0277* (2013.01)

(58) Field of Classification Search
CPC .... G06Q 30/00; G06Q 30/02; G06Q 30/0207; G06Q 30/0239; G06Q 30/0241
USPC .......................... 705/14.53, 14.13; 709/203
See application file for complete search history.

(56) References Cited

U.S. PATENT DOCUMENTS

| | | | | |
|---|---|---|---|---|
| 2001/0042010 A1* | 11/2001 | Hassell | ................ | G06Q 30/02 705/14.13 |
| 2004/0103145 A1* | 5/2004 | Jenkins | .................... | G06F 8/00 709/203 |
| 2012/0330750 A1* | 12/2012 | Ramer | ................... | G06Q 30/02 705/14.53 |

* cited by examiner

*Primary Examiner* — Marilyn G Macasiano
(74) *Attorney, Agent, or Firm* — HM Law Group LLP; Vani Moodley, Esq.

(57) ABSTRACT

A computer-implemented method for generating coupons is provided. The method comprises receiving a query for a coupon from a publisher for an ad unit; wherein said ad unit is designed by a third party designer and comprises certain visually perceptible elements; responsive to receiving the query determining if a coupon should be generated for the ad unit; if it is determined that a coupon should be generated for the ad unit, then: (A) retrieving stored data to corresponding to the ad unit; (B) using the stored data, to automatically generate a coupon for displaying together with the ad unit; wherein said coupon includes elements that visually correspond to the visually perceptible elements of the ad unit; and (C) transmitting said coupon to the publisher for displaying with the ad unit.

17 Claims, 13 Drawing Sheets

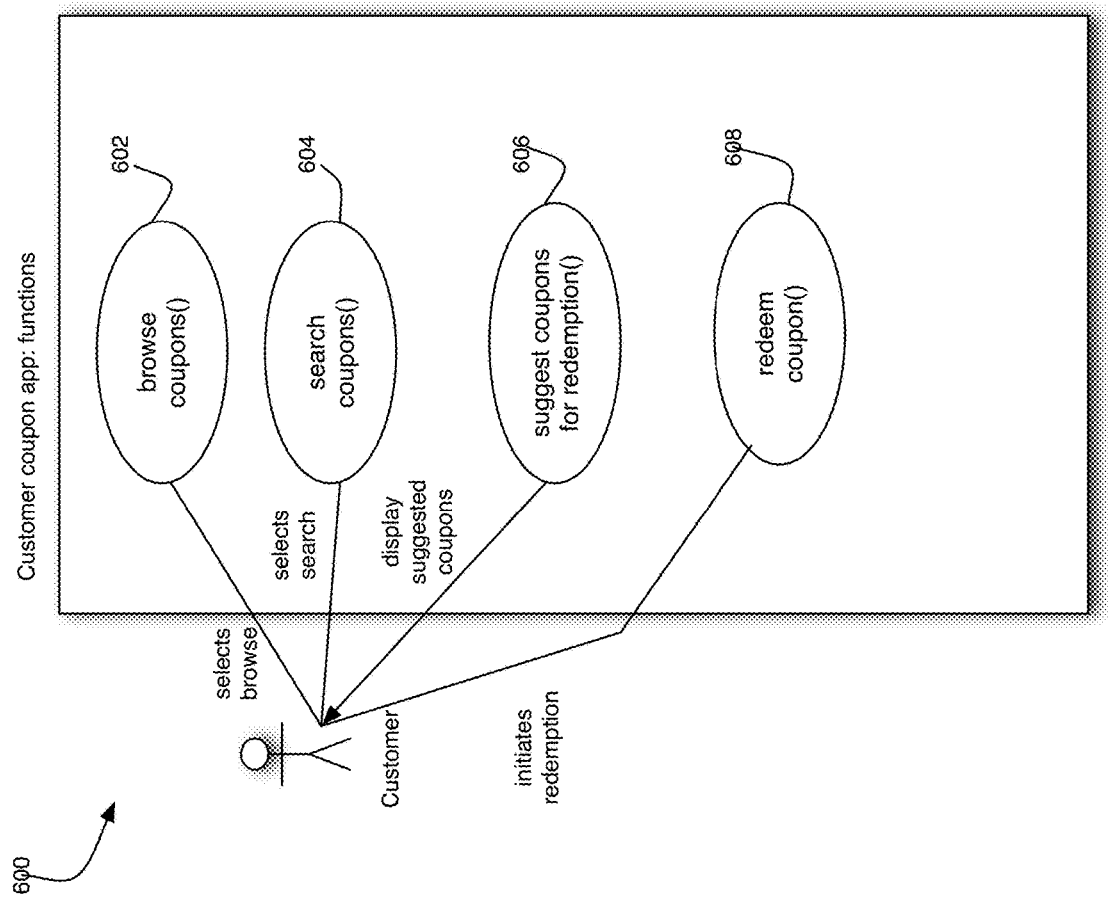

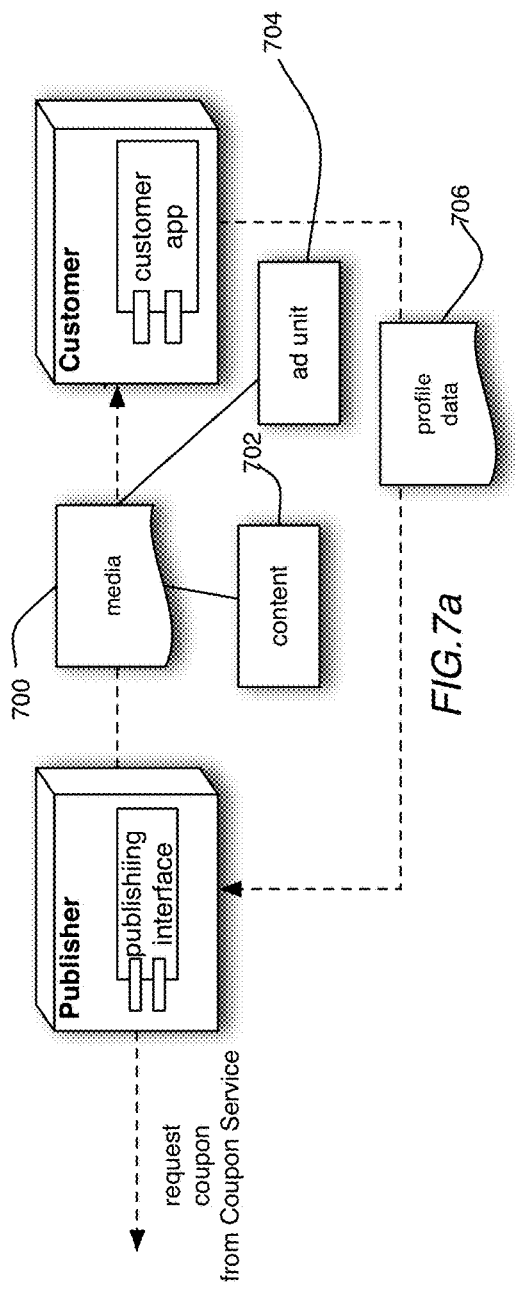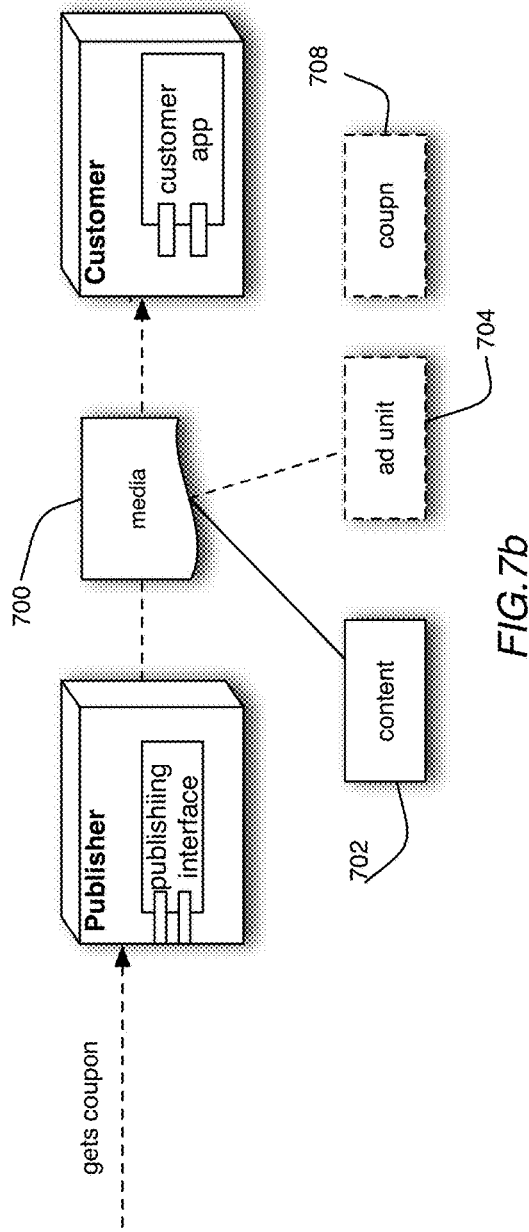

COUPON PLACEMENT WITHIN AN ADVERTISEMENT

This application claims the benefit of priority to U.S. Provisional Patent Application 62/039,839 entitled "COUPON PLACEMENT WITHIN AN ADVERTISEMENT", filed on Aug. 20, 2014, the entire specification of which is incorporated herein by reference.

FIELD

Embodiments of the present invention relate to promotional offers, particularly in the form of coupons.

BACKGROUND OF THE INVENTION

In the world of modern advertising, advertisers make use of designers or ad agencies to design ads (also referred to herein as ad units), and publishers to publish said ads. The ads are usually produced by a complicated design and production process, which is very expensive.
For optimal effect in influencing the behavior for consumer, an ad unit has to have certain design elements and in overall aesthetic appeal.

The publishers operate sophisticated ad delivery networks, and generally do not engage in making modifications to ad units, and are unconcerned about the overall aesthetic appeal of an ad unit. Examples of publishers include companies such as Facebook, and Google. Advertisers may be manufacturers or vendors of products and services. To incentivize the purchase of goods and services, advertisers often issue coupons containing certain promotional offers associated with said goods and services.

SUMMARY OF THE INVENTION

Aspects of the present invention disclose methods and systems for generating dynamic coupons that a personalized to a consumer. For example, the size of the promotional offer in a coupon, and its terms may be determined based on information known about the consumer.

Each coupon is generated for an ad unit that is published by a publisher. Simply generating a coupon and displaying it in conjunction with an ad unit often leads to the problem that the aesthetic appeal of the ad unit may be disrupted by the presence of the coupon. Moreover, when displaying the coupon with the ad unit, there is a danger that the coupon may actually obscure important elements of the ad unit. Thus, one aspect of the present invention disclose is controlling the coupon's placement location and a coupon's dynamic behavior so that when the coupon is displayed together with an ad unit, the coupon in the ad unit appear as an integrated unit by design.

In another aspect, the design elements of the coupon are matched to the design elements of the ad unit thereby to further enhance the impression that the coupon to the ad unit where designed together.

Other aspects of the invention will be apparent from other detailed description that follows.

BRIEF DESCRIPTION OF THE FIGURES

FIG. 6 shows the use cases for the customer coupon app, in accordance with one embodiment of the invention.

FIGS. 7a-b shows a Publisher publishing media on a Customer node, in accordance with one embodiment of the invention.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
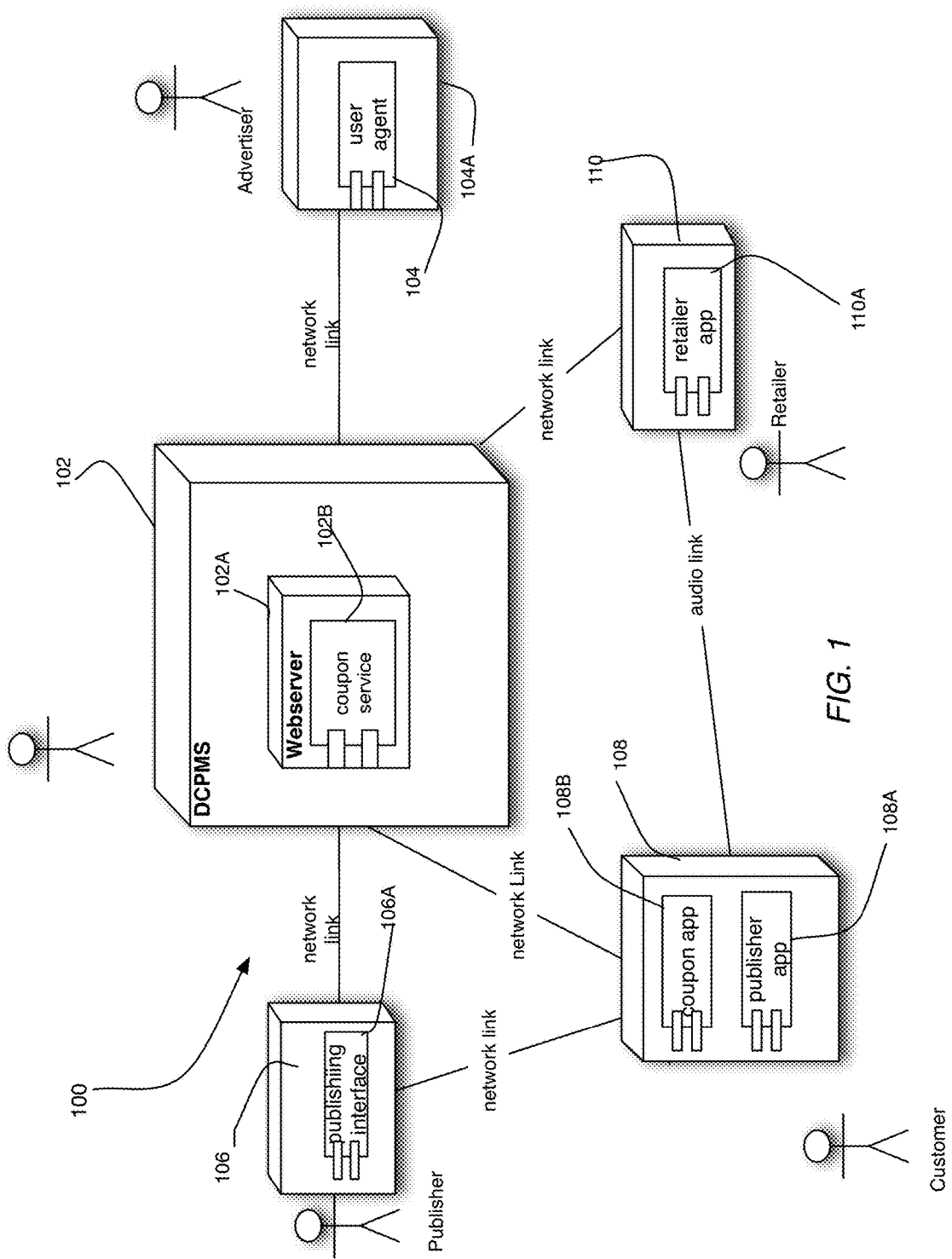
FIG. 1 shows a deployment drawing in accordance with one embodiment of the invention

FIG. 1 shows a deployment scenario 100 in accordance with one embodiment of the invention. Referring to FIG. 1 a Digital Coupon Personalization and Management System (DCPMS) 102 includes a server component 102A which implements a Coupon Service (CS) 102B. The CS 102B is under control of a Coupon Service Provider (CSP) A plurality of advertiser nodes 104 each equipped with an appropriate user agent (browser) 104A are communicatively coupled to the DCPMS 102 by means of a network link 112. In one embodiment, each advertiser node 104 may include a computing device such as a laptop or PC, and the network link 112 may comprise the Internet. Each advertiser node 104 represent an Advertiser who uses the CS to generate coupons on its behalf, as will be explained.

The DCPMS 102 may also be communicatively coupled with plurality of publisher nodes 106 by means of a network link 112. Each publisher node 106 represent a computing device such as a PC and includes a publishing interface 106A, which represent the mechanism whereby a Publisher is able to publish media on a customer node 108 for viewing by a Customer. Examples of Publishers includes CNN, Facebook, YouTube, etc.

The customer node 108 represents a customer device such as smartphone or tablet PC. In one embodiment, the customer node 108 may include a publisher app 108A and a coupon app 108B. The publisher app 108A may be configured to receive media content from a Publisher, as will be described more fully later. The media content may include a personalized coupon generated by the DCPMS 102.

Finally, the deployment scenario 100 also includes a retailer node 110 which represents retailer. In one embodiment, the customer node 108 communicates with the retailer node 110 via an audio link 114.

Figure 2:
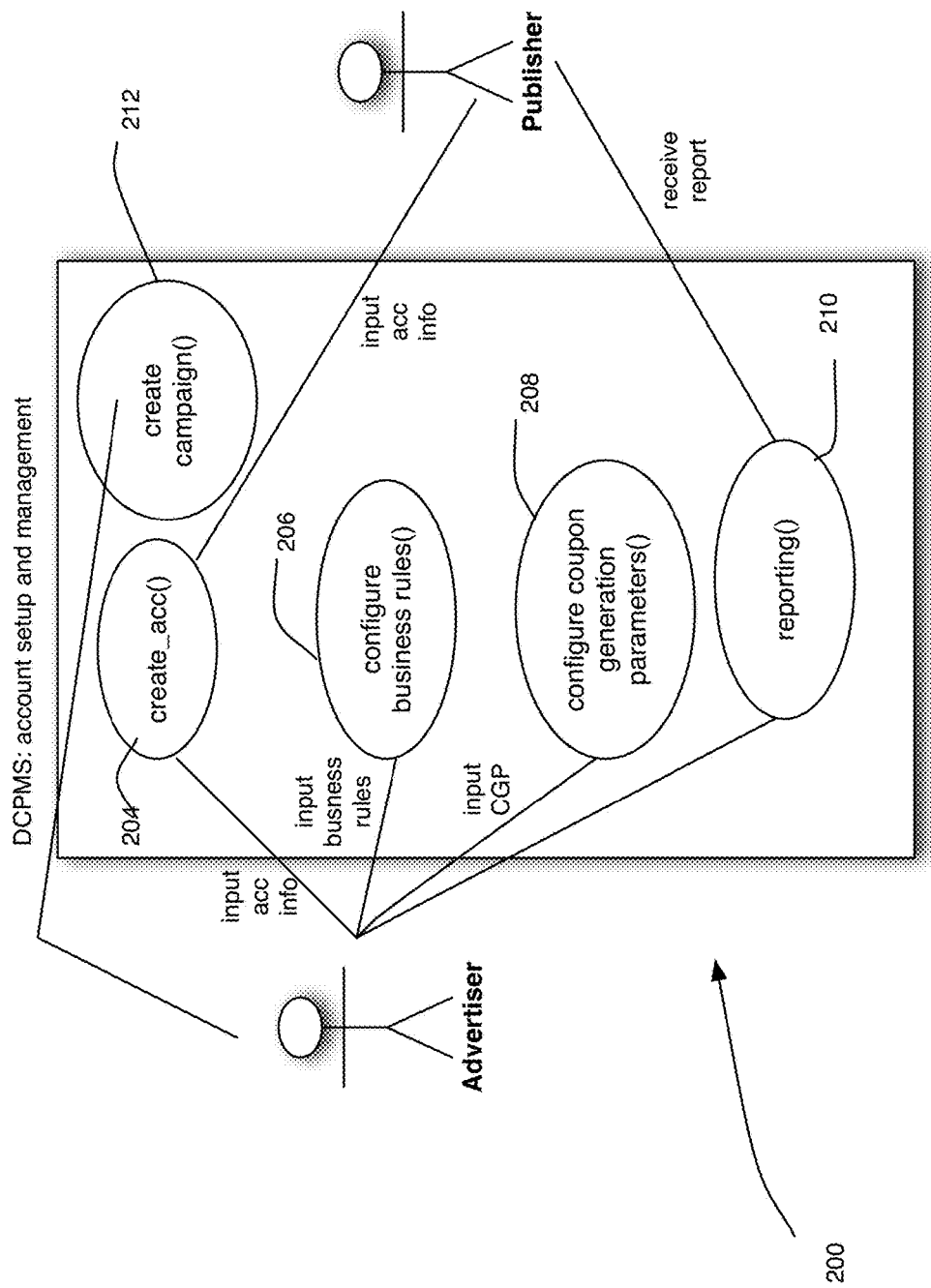
FIG. 2 shows the use cases for the DCPMS, in accordance with one embodiment of the invention.

FIG. 2 shows use cases 200 for the DCPMS 102, in accordance with one embodiment of the invention. As will be seen, the DCPMS 102 supports a create_account ( ) function 202 which allows an Advertiser and a Publisher to create user accounts on the DCPMS 102. A configure_business_rules ( ) function 208 allows an Advertiser to provision business rules and objectives in the DCPMS 102. The business rules and objectives may be used to generate highly personalized coupons for publishing to particular customers, as will be described. The use cases 200 also includes a configure_coupon_generation_parameters ( ) process 210 whereby an advertiser configures coupon generation parameters which are used to generate personalized coupons. Examples of coupon generation parameters include the following:

(a) Demographic data;
(b) Geographic data;
(c) Offer size for a coupon offer. This may be specified in the terms of a minimum offer size and a maximum offer size;
(d) The particular medium for which a coupon needs to be generated. Examples of media include video content, banner ads, and printed ads.
(e) Publisher. Examples of publishers includes Facebook, YouTube, CNN etc,;
(f) Context for the coupon. Examples of contexts includes sports, politics, science, business, lifestyle, etc.;
(g) Psycho-graphic information comprising values, opinions, attributes, interests, and lifestyles associated with a target demographic group.

Finally, the use cases 200 include a reporting function 212 whereby reports are generated for Advertisers and Publishers.

Figure 3:
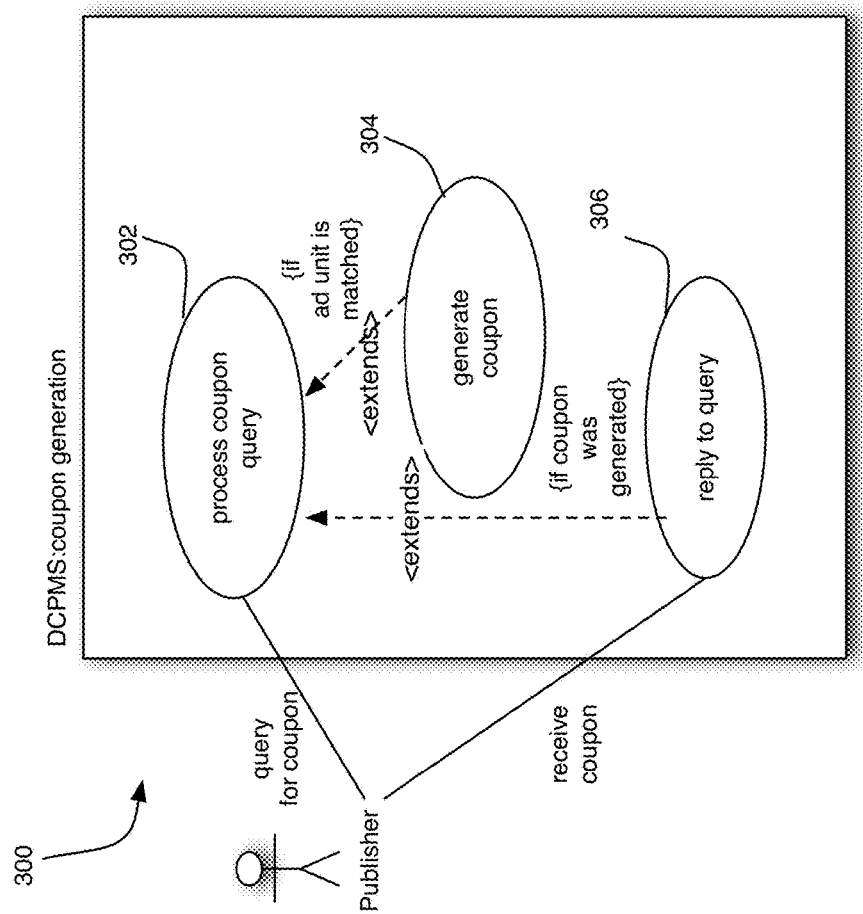
FIG. 3 shows the use cases for coupon generation, in accordance with one embodiment of the invention.
Figure 5:
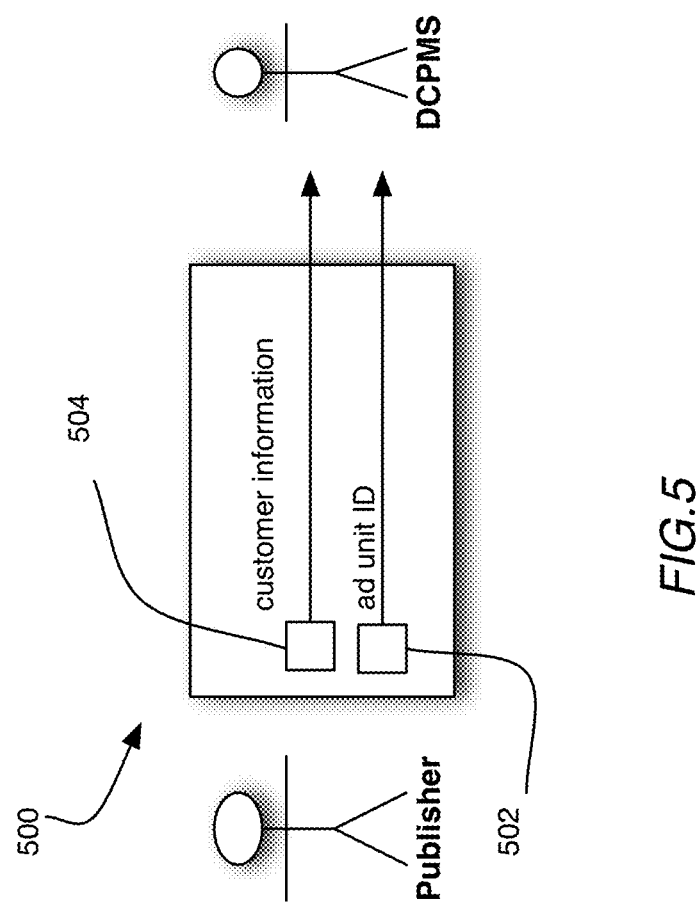
FIG. 5 shows a coupon query Q1, in accordance with one embodiment of the invention.

Referring now to FIG. 3 of the drawings, there is shown use cases 300 for coupon generation, in accordance with one embodiment of the invention. In terms of the use cases 300, a Publisher sends a query Q1 to the DCPMS 102. The query Q1 is a request for a coupon. Generally, at the time of sending the query Q1, the Publisher is already publishing content to a customer and is the further, typically displaying an advertisement unit (ad unit) in association with the content. This can be seen in FIG. 7a, which shows media 700 being published on a customer node 108, wherein the media 700 includes content 702 and an ad unit 704. FIG. 5 shows the elements of the query Q1 in one embodiment. As will be seen, Q1 includes customer information 500 and an ad unit id 502. The ad unit id 502 corresponds to the ad unit being shown to the Customer. The customer information corresponds to profile information/data 706 (see FIG. 8) about the Customer. The profile data 706 is collected from the Customer node 108 by the Publisher and includes that customer's browsing behavior and information about the customer device itself.

Responsive to receiving the coupon query Q1, the DCPMS 102 executes a process coupon query block 304. Under this block, the DCPMS 102 attempts to match the ad unit id in the coupon query Q1 in an ad unit list. The ad unit list is provisioned by an Advertiser and is basically a listing of ad units for which coupons must be generated by DCPMS 102. Thus, under the process 304, if the ad unit id is matched then a generate coupon function 306 is executed. Under this process, a personalized coupon is generated based on the coupon configuration parameters and based on machine learning techniques.

The use cases 300 also include a reply in query function 308 wherein the DCPMS 102 replies to the query Q1 by returning a coupon to the publisher 302 or a reply indicating that no coupon is available for the particular ad unit associated with the coupon request Q1. FIG. 7B shows the media 700 that is published on a customer node 108 as updated by the Publisher to include a coupon 708.

Figure 4:
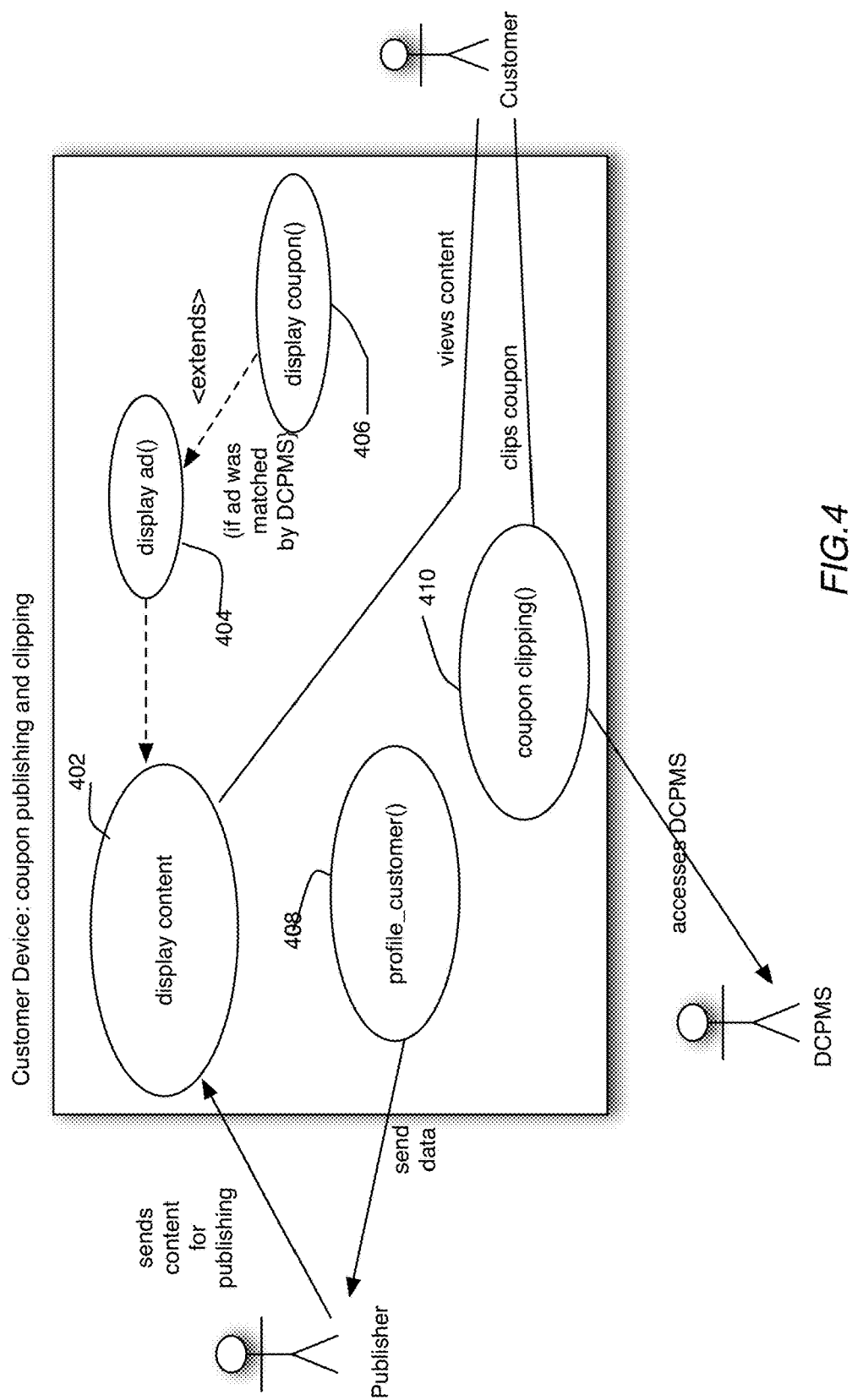
FIG. 4 shows the use cases for coupon clipping and publishing in accordance with one embodiment of the invention.

FIG. 4 shows use cases 400 for coupon displaying and clipping on the customer node 402, in accordance with one embodiment of the invention. As will be seen, the customer node 108 is configured to display content by executing a display content function 402. The display content function 402 may be extended to include a display ad function 404 which in turn may be extended to include a display coupon function 406 if the ad unit associated with the ad being displayed is match by the DCPMS 102, as described earlier. A profile customer ( ) function 408 collects profile information for a customer which is transmitted to the Publisher. The use cases 400 also includes a coupon clipping ( ) function 410. Under the coupon clipping function 410, a Customer performs a 'clipping action' in relation to a coupon. For example, in one embodiment, the clipping action may include selection of a clipping button associated with the coupon. Responsive to said clipping action, the coupon clipping function 410 generates a coupon clipping notification and transmits it to the DCPMS 102.

Figure 8:
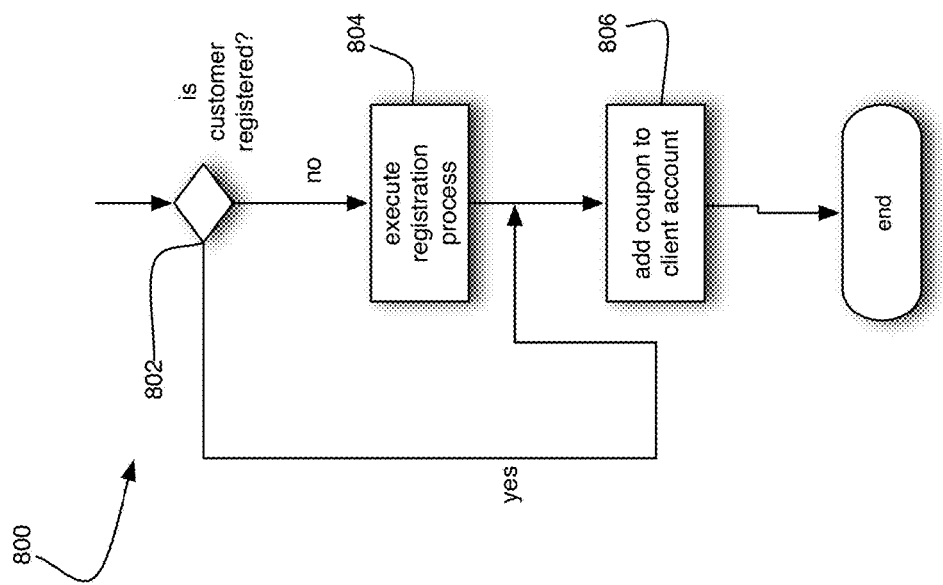
FIG. 8 shows a flowchart for processing a coupon clipping notification, in accordance with one embodiment of the invention.

Referring now to FIG. 8 of the drawings, there is shown a process 800 executed on the DCPMS 102 responsive to receiving a coupon clipping notification. At block 802, a check is made to determine if the customer is a registered customer. In one embodiment this step includes validating customer credentials included in the coupon clipping notification. If it is determined that the customer was not registered, then at block 804, a registration process is executed in order to register the customer. This process may include redirecting a customer to a registration page in order for the customer to input registration information. At block 806, the coupon identified by the coupon id in the coupon clipping notification is added to the customer's account. At this point, the DCPMS 102 may inform the Publisher that the coupon has been clipped, in which case the publisher may instruct a browser being used by the customer node 108 to view the coupon to stop displaying the coupon.

In the case where a Customer is using the coupon app 108B to view the published content, the coupon app 108B includes logic to stop showing the coupon as soon as the coupon clipping action is performed. Thus, a seamless coupon clipping experience is facilitated.

Figures 9A, 9B:
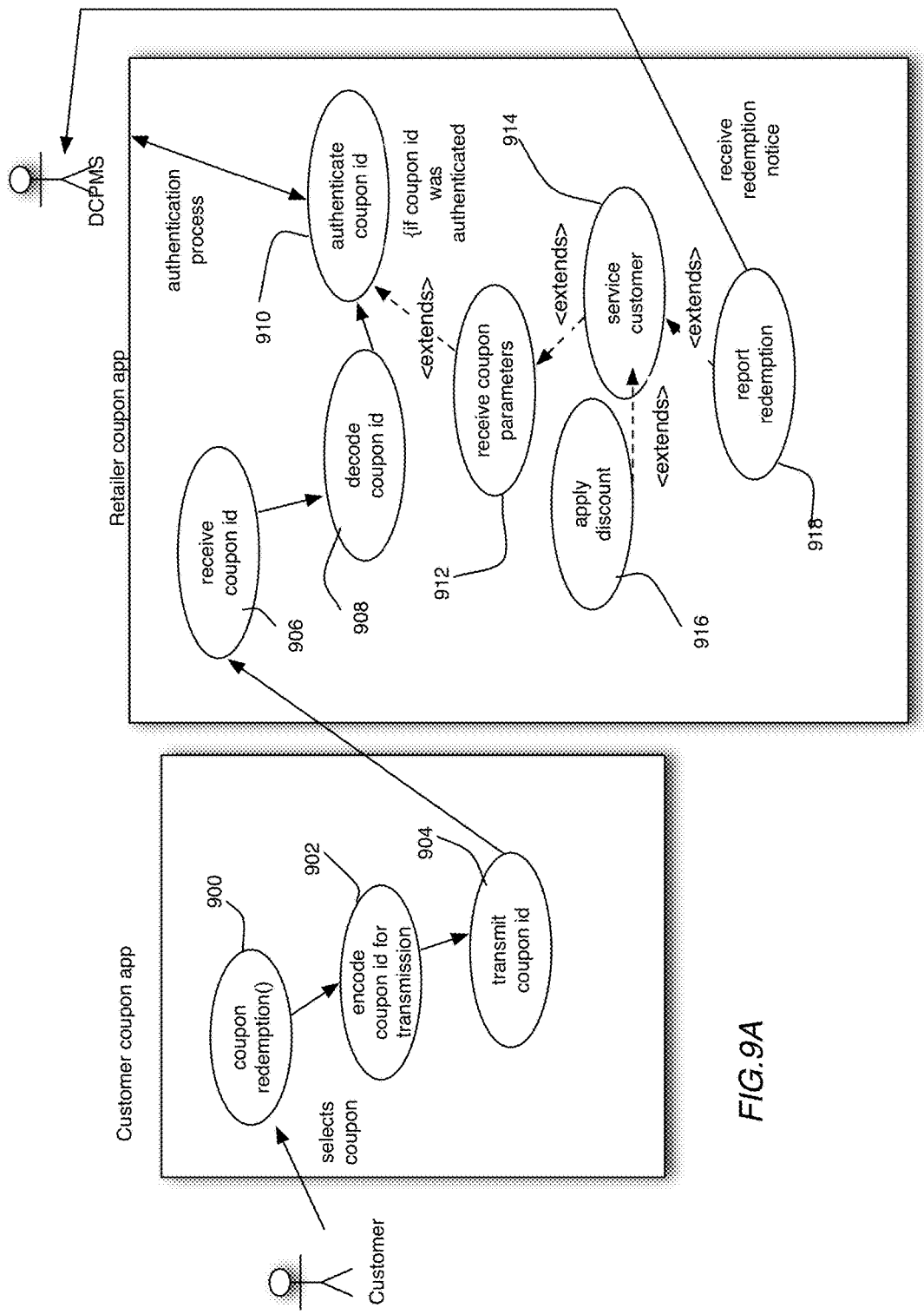
FIG. 9A shows the use cases for coupon redemption by the customer coupon app, in accordance with one embodiment of the invention.
FIG. 9B shows the use cases for coupon redemption by the retailer coupon app, in accordance with one embodiment of the invention.

Referring now to FIG. 9A of the drawings, there is shown a use case for coupon redemption by a Customer. As will be seen, a coupon redemption ( ) function 900 includes a process 902 for encoding a coupon for transmission, and a process 904 for transmitting said encoded coupon to a retailer node. In one embodiment, the process 902 for encoding the coupon for transmission encodes the coupon as an audio signal which is then transmitted via a speaker associated with the customer node 108. The retailer node 110 then uses a microphone to detect the audio encoding. FIG. 9B also shows a use case for the retailer coupon app 110A to redeem a coupon, in accordance with one embodiment. Referring to FIG. 9B, process 906 comprises receive coupon id ( ) function whereby a microphone of the retailer node 110 is used to listen for the coupon transmission from the customer node 108. A decode coupon id ( ) process 908 decodes the audio signal in order to extract the coupon id. An authenticate coupon id ( ) process 910 includes transmission of the coupon id to the DCPMS 102 by the retailer coupon app for authentication. The DCPMS 102 authenticates the coupon id and returns coupon parameters associated with the coupon id that was authenticated. The retailer coupon app then executes a receive coupon parameters ( ) function 912 to receive the coupon parameters from the DCPMS 102. A service customer ( ) function 914 includes servicing the customer by providing the goods and/or services associated with the coupon. A apply discount ( ) function 916 extends the service customer ( ) function 914 to apply the discount indicated in the coupon to the transaction with the customer. A report redemption ( ) function 918 includes operations to report any coupon redemption to the DCPMS 102.

Referring now to FIG. 6 of the drawings, use cases 600 are associated with the coupon app 108B. As will be seen, the use cases 600 may include a browse coupons ( ) function 602. This function allows a Customer to browse previously clipped coupons. A search coupon ( ) function 604 allows the Customer to search for particular coupons based on search criteria. A suggest coupon for redemption ( ) function 608 implements functionality to proactively suggest coupons for redemption to a Customer. For example, in one embodiment based on the location, the Customer may be shown coupons that are only available for redemption at that particular location. Finally, the use case 600 includes a redeem coupon function ( ) 610, whereby the Customer may redeem a selected coupon, as has been described above.

Figure 10:
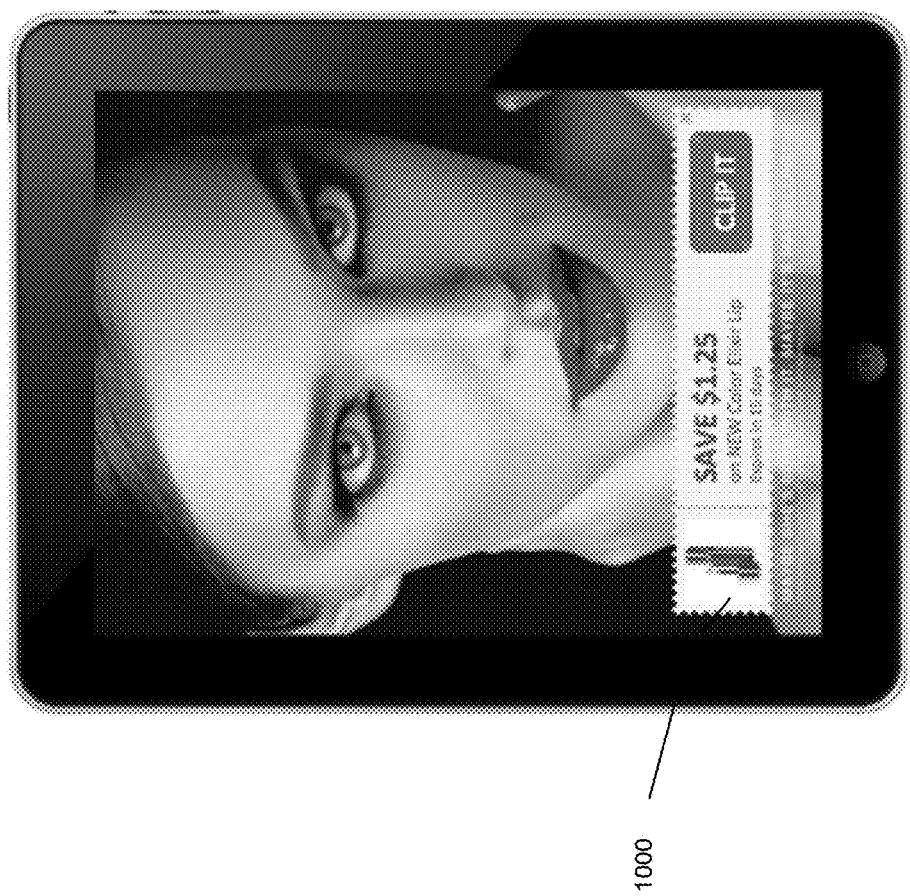
FIG. 10 shows an example of published coupon, in accordance with one embodiment of the invention.
Figure 11:
FIG. 11 shows the published coupon of FIG. 10 in magnified view, in accordance with one embodiment of the invention.

Referring now to FIG. 10 of the drawings, there is shown a coupon 1000 which is published in association with an advertisement for women's lipstick. The coupon 1000 is shown in magnified view FIG. 11 of the drawings. As will be seen, the coupon 1000 includes a discount of $1.25, and a coupon expiration, which is set to 15 days. Further, the coupon 1000 includes a 'clip it button'. This button may be used to clip the coupon 1000 in accordance with the techniques disclosed herein.

Figure 12:
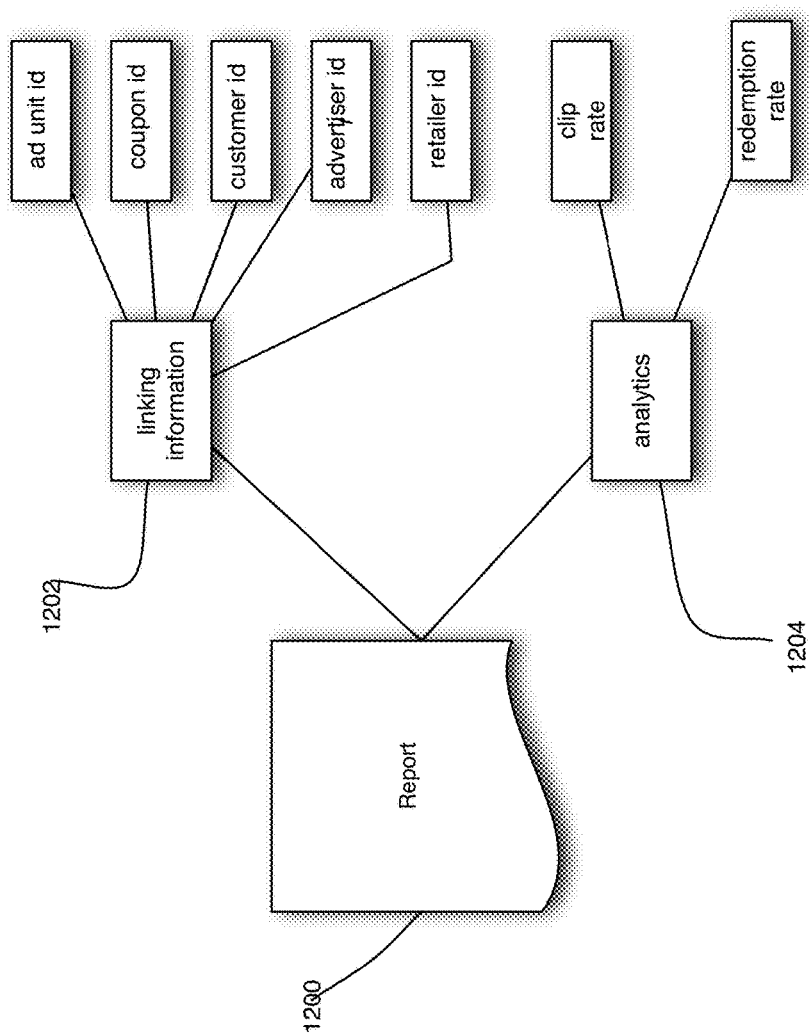
FIG. 12 shows an example of a report to an Advertiser, in accordance with one embodiment of the invention.

FIG. 12 shows a report 1200 that may be generated for an Advertiser, in accordance with one embodiment. The report 1200 includes linking information 1202 to link ad unit id, coupon id, customer id, advertiser id, and retailer id. Report 1200 also includes art analytics component 1204 which may provide detailed analysis on a coupon's clip rate and its redemption rate. The coupon clip rate and redemption rate may be used to optimize a coupon campaign. As has been mentioned, machine running techniques are used to generate a coupon in a dynamic fashion. For example, coupon may be configured to have a certain clip rate and a certain redemption. If a clip rate for a coupon is too high the system may dynamically reduce the discount associated with the coupon in order to throttle or scale back the redemption rate. Alternatively, if the coupon clip rate is too low, then the DCPM 102 S may dynamically increase the discount associated with the coupon in order to achieve the desired clip rate. Likewise, a coupons redemptions rate may be used to dynamically scale the offer sized associated with the coupon in order to achieve a desirable redemption rate.

One advantage of the techniques, and systems described above is that ads and coupons are displayed together. A further advantage is that the coupons a personalized for each customer. This means that the same ad unit will be dynamically associated with a different coupon (the product to which the coupon relates may be the same, but the size of the offer, and its terms may vary from customer to customer). Typically, the ad with which a coupon is displayed is created by an ad agency and involve a lengthy and complicated design and production process, which can be quite expensive. The design and production process may include the careful selection of certain design elements such as the fonts, images, colors, etc., for the ad. There is a real danger that a coupon generated in accordance with the techniques and systems described above for a particular ad, said coupon when displayed in conjunction with said add may destroy the aesthetic appeal of the ad, or even become intrusive in the sense that it may obscure certain elements of the ad. Thus, one aspect of the present invention includes tightly controlling design and presentation aspects of a coupon to match the design and presentation aspects of an ad. The design and presentation aspects may be matched by exercising control over the placement of a coupon with and an ad unit, up matching the design elements of a coupon with the design elements of an ad unit, and by controlling any dynamic behavior associated with the coupon.

Controlling the Placement of a Coupon within an Ad Unit

In one embodiment, the reply to the coupon query Q1 may include placement information to control the placement of a coupon within the ad unit. Controlling the placement of a coupon within an ad unit is important so as not to obscure the content associated with the ad unit. For this embodiment, the DCPMS 102 maintains coupon placement information which specifies spatial placement information for each coupon associated with an ad unit (as identified by its ad unit id). The coupon placement information may be specified in terms of coordinates of the ad unit. For example, if an ad unit is visualized as a canvas having certain dimensions, and are origin point such as a corner of the ad unit, then the placement of a coupon for the ad unit may be specified in terms of distances relative to the origin point. The coupon placement information may be represented in a dynamic programming language, such as JavaScript, which is commonly used as an assembly language for web-based, and other content.

In one embodiment, the coupon placement information for an ad unit may be obtained from the ad agency or designer involved in the production of the ad unit. In some cases, a tool may be provided to the designer to assist the designer in understanding at least one optimal location for each ad unit for coupon placement. Thus, each ad unit may have more than one optimal placement location. In a design sense, the optimal location for coupon placement will be that location that does not obscure information in the ad unit, and also does not disrupt the aesthetic nature of the ad unit.

Matching the Design Elements of a Coupon with the Design Elements of Ad Unit

In some cases, in addition to controlling coupon placement, the design elements of a coupon may be matched to the design elements of the ad with which the coupon will ultimately be displayed. Said design elements may include colors, fonts, font sizes, etc. The purpose of said matching is that wherein the coupon and the ad unit are viewed together the overall impression is that they were designed together. In one embodiment, matching criteria for the design elements may be specified by a designer for each ad unit.

Controlling Coupon Behavior within an Ad Unit

In one embodiment, in addition to placement information behavior information to control the behavior of a coupon may also be provided. For example, the behavior information may control coupon animation: how it can appear in one place and them move to another; how it can shake; expand and contract, flash with colors, etc.

Once the ad unit id associated with a coupon query Q1 is matched, a look up is performed to identify coupon placement information, coupon design information, and coupon behavior information for the ad unit. If such information has been provisioned in the DCPMS 102 then a coupon is generated for the ad unit so that it matches the design elements of the ad unit coupon is generated. The coupon will be generated so that its design the coupon is sent back to the publisher in the form of a reply to the query Q1. Said reply would also include any coupon placement and behavioral information uncovered by the look up.

Coupon Placement Testing

Advertising is not an exact science, and it is difficult to predict a priori if a particular coupon placement location with and an ad unit is effective or not. One effective measure of the effectiveness of the coupons placement location is to track how often a coupon is clipped when it is shown at a particular location, all other coupon parameters remain in the same. Thus for example, if a designer has identified several coupon placement locations for an ad unit, say A, B, and C, then in one embodiment DCPMS 102 may be configured to execute a coupon placement testing procedure as follows:

Step 1: when a request for a coupon for the ad unit is received, the system generates a coupon for the ad unit with a certain terms including offer size, expiration. etc.

Step 2: for the next N number of requests for coupons for the same ad unit, the system generates the same coupon with the same terms, but varies the coupon placement location sequentially between the available locations. Thus, if for the previous request for a coupon, the location A was given, then for the current request, the location B will be given, and for a subsequent request, the location C will be given. After each of the locations a, B, C have been given once, then the system selects the locations A, B, and C again sequentially for a second time, a third time, etc. until the number N is reached.

Step 3: the system then tracks the total number of times a coupon is clipped, for each location. The higher the number, the higher the effectiveness of that location for coupon placement.

In the embodiments described above, the publisher is the entity that finally binds each coupon with an ad unit. In some embodiments, ad units may be received directly from advertisers or the ad agencies. These ad units will be stored within the system, and wherein a query for coupon is received, the system will dynamically generate a coupon for the ad unit, and inserted into the ad unit, before delivering the ad unit to the publisher. Thus, all uncertainties with regard to coupon placement, coupon behavior, and the blending all matching of design elements from the ad unit with design elements for a coupon will be managed in a seamless fashion by a single entity.

In some embodiments DCPMS 102 may employ machine learning to identify optimal coupon placement locations for an ad unit, and to match or blend the design elements of a coupon with the design elements of an ad unit. Thus, advantageously, a third party operator of a coupon service may (a) dynamically generate a coupon for a third party advertiser, (b) blend said coupon with an ad unit for the third party advertiser, and (c) deliver said blended coupon an ad unit to the third party publisher for publishing on an ad delivery network. Moreover, the coupon placement location within the ad unit may be optimally selected to be the most effective for leading to higher coupon clipping rate.

In some embodiments, the coupon server system defined by the DCPMS 102 may stall certain visually perceptible elements corresponding to the ad units. The visually perceptible elements may be obtained by the designers of the ad unit and may include elements such as color, font, logo information, and other graphical elements. For these embodiments, when a coupon is dynamically generated based on profile information for a consumer, the visual elements of the coupon are also matched to the visually perceptible elements of the ad unit. This ensures that when the coupon an ad unit are integrated, they appear as a single unit by design.

The technology disclosed herein has thus far been described with respect to coupons. However it is to be understood that the technology is not limited to only coupons. Instead, the technology covers any type of promotional item for insertion into an ad unit. For example, other types of promotional items such as items designed to induce a "call to action" may be generated and delivered to the publisher in accordance with the techniques disclosed herein. Examples of calls to action may include an offer of free samples for a product or service associated with an ad unit, or an offer to test drive a vehicle being advertised in the ad unit.

Figure 13:
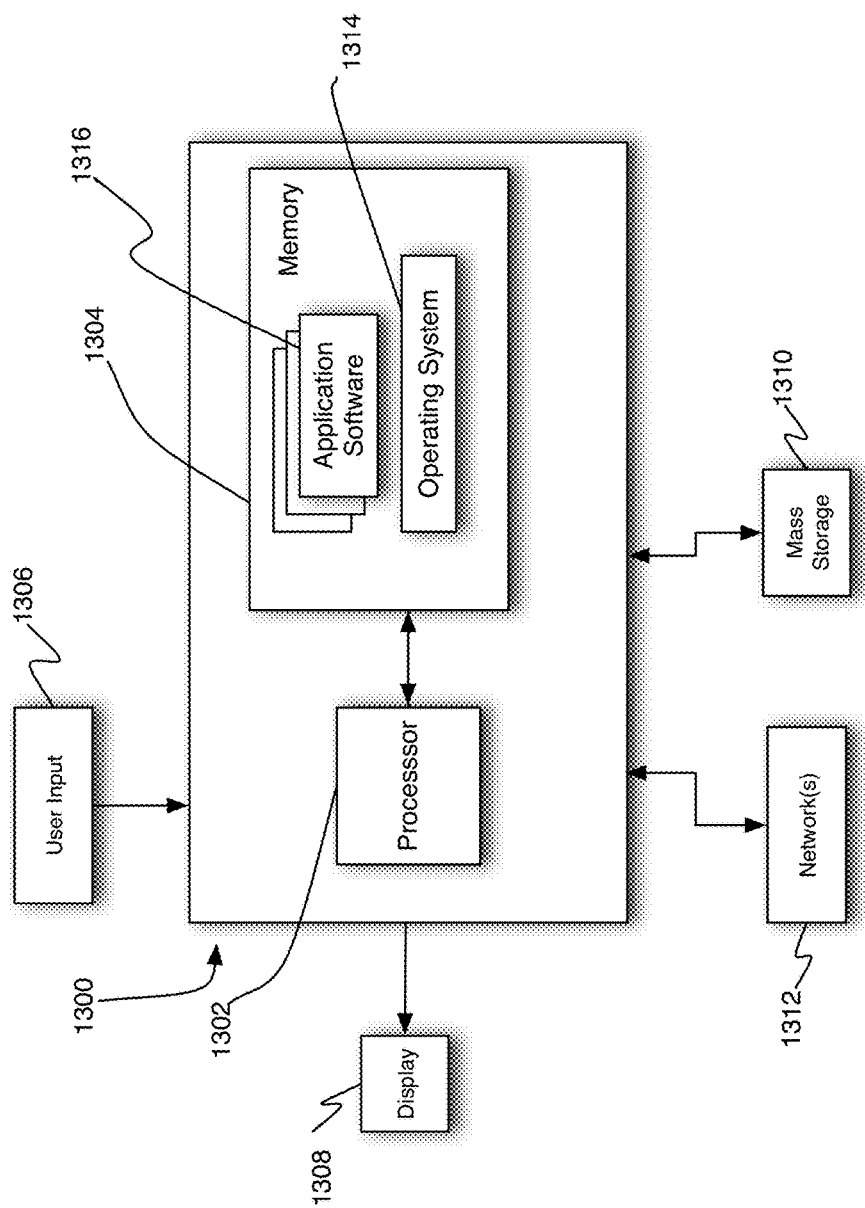
FIG. 13 shows a high-level block diagram of hardware for implementing the DCPMS, in accordance with one embodiment of the invention.

FIG. 13 shows an example of hardware 1300 that may be used to implement the DCPMS 102 in accordance with one embodiment. The hardware 1300 may include at least one processor 1302 coupled to a memory 1304. The processor 1302 may represent one or more processors (e.g., microprocessors), and the memory 1304 may represent random access memory (RAM) devices comprising a main storage of the hardware, as well as any supplemental levels of memory e.g., cache Memories, non-volatile or back-up memories (e.g. programmable or flash memories), read-only memories, etc. In addition, the memory 1304 may be considered to include memory storage physically located elsewhere in the hardware, e.g. any cache memory in the processor 1302, as well as any storage capacity used as a virtual memory, e.g., as stored on a mass storage device.

The hardware also typically receives a number of inputs and outputs for communicating information externally. For interface with a user or operator, the hardware may include one or more user input output devices 1306 (e.g., a keyboard, mouse, etc.) and a display 1308. For additional storage, the hardware 1300 may also include one or more mass storage devices 410, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1312 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1312 and each of the components, as is well known in the art.

The hardware 1300 operates under the control of an operating system 1314, and executes application software 1316 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

The invention claimed is:

1. A computer-implemented method for generating coupons by a coupon server system, comprising:
    receiving a query for a coupon from a publisher for an ad unit being displayed by the publisher on a consumer device, wherein the query includes an ad unit id corresponding to the ad unit, and wherein said ad unit is designed by an advertiser and comprises certain visually perceptible elements;
    responsive to receiving the query, generating a coupon based on a determination if the ad unit id is present in an ad unit list provisioned by the advertiser;
    if it is determined that a coupon should be generated for the ad unit, then:
        (A) retrieving stored data corresponding to the ad unit;
        (B) using the stored data, to automatically generate a coupon for displaying together with the ad unit, wherein said coupon includes elements that visually correspond to the visually perceptible elements of the ad unit;
        (C) determining coupon placement information specifying a spatial placement location of the coupon within the ad unit based on a monitoring of coupon clipping rate for each of a plurality of coupon placement locations; and
        (D) transmitting said coupon along with the determined coupon placement information to the publisher for displaying said coupon within the ad unit being viewed on the customer device.

2. The method of claim 1, wherein said visually perceptible elements comprises color, fonts, graphics and/or logos.

3. The method of claim 1, further comprising determining coupon placement information in order to control placement location for the coupon within the ad unit.

4. The method of claim 1, further comprising selecting one coupon placement location if the determined coupon placement information includes a plurality of coupon placement locations.

5. The method of claim 4, further comprising monitoring a coupon clipping rate associated with each of the plurality of coupon placement locations in order to determine an optimal coupon placement location for the coupon.

6. The method of claim 1, further comprising retrieving coupon behavior information to control dynamic behavior of the coupon when displayed together with the ad unit and transmitting said coupon behavior information to the publisher.

7. The method of claim 6, wherein the coupon placement information and the coupon behavior information are specified in a dynamic programming language.

8. The method of claim 1, wherein the coupon is personalized based on profile information for a consumer being targeted by the ad unit.

9. A non-transitory computer-readable medium, having stored thereon a sequence of instructions which when executed by a processor, causes a system to perform a method, comprising:
    receiving a query for a coupon from a publisher for an ad unit being displayed by the publisher on a consumer device, wherein the query includes an ad unit id corresponding to the ad unit, and wherein said ad unit is designed by an advertiser and comprises certain visually perceptible elements being published by the publisher on a consumer device;
    responsive to receiving the query, generating a coupon based on a determination if the ad unit id is present in an ad unit list provisioned by the advertiser;
    if it is determined that a coupon should be generated for the ad unit, then:
        (A) retrieving stored data corresponding to the ad unit;
        (B) using the stored data, to automatically generate a coupon for displaying together with the ad unit, wherein said coupon includes elements that visually correspond to the visually perceptible elements of the ad unit;
        (C) determining coupon placement information specifying a spatial placement location of the coupon within the ad unit based on a monitoring of coupon clipping rate for each of a plurality of coupon placement locations; and
        (D) transmitting said coupon along with the determined coupon placement information to the publisher for displaying said coupon within the ad unit being viewed on the customer device.

10. The computer-readable medium of claim 9, wherein said visually perceptible elements comprises color, fonts, graphics and/or logos.

11. The computer-readable medium of claim 9, further comprising determining coupon placement information in order to control placement location for the coupon within the ad unit.

12. A coupon server system, comprising:
a processor; and
a memory for storing instructions which when executed by the processor causes the coupon server system to perform a method for generating coupons, comprising:
receiving a query for a coupon from a publisher for an ad unit being displayed by the publisher on a consumer device, wherein the query includes an ad unit id corresponding to the ad unit, and wherein said ad unit is designed by an advertiser and comprises certain visually perceptible elements being published by the publisher on a consumer device;
responsive to receiving the query, generating a coupon based on a determination if the ad unit id is present in an ad unit list provisioned by the advertiser;
if it is determined that a coupon should be generated for the ad unit, then:
(A) retrieving stored data corresponding to the ad unit;
(B) using the stored data, to automatically generate a coupon for displaying together with the ad unit, wherein said coupon includes elements that visually correspond to the visually perceptible elements of the ad unit;
(C) determining coupon placement information specifying a spatial placement location of the coupon within the ad unit based on a monitoring of coupon clipping rate for each of a plurality of coupon placement locations; and
(D) transmitting said coupon along with the determined coupon placement information to the publisher for displaying said coupon within the ad unit being viewed on the customer device.

13. The coupon server system of claim 12, wherein said visually perceptible elements comprises color, fonts, graphics and/or logos.

14. The coupon server system of claim 12, wherein the method further comprises determining coupon placement information in order to control placement location for the coupon within the ad unit.

15. The coupon server system of claim 12, wherein the method further comprises selecting one coupon placement location if the determined coupon placement information includes a plurality of coupon placement locations.

16. The coupon server system of claim 15, wherein the method further comprises monitoring a coupon clipping rate associated with each of the plurality of coupon placement locations in order to determine an optimal coupon placement location for the coupon.

17. The coupon server system of claim 12, wherein the method further comprises retrieving coupon behavior information to control dynamic behavior of the coupon when displayed together with the ad unit and transmitting said coupon behavior information to the publisher.

* * * * *